US010890121B1

(12) United States Patent
Logendran et al.

(10) Patent No.: US 10,890,121 B1
(45) Date of Patent: Jan. 12, 2021

(54) PROGNOSTIC TORSIONAL DAMPER DAMAGE DETERMINATION IN MACHINE SYSTEM

(71) Applicant: Caterpillar Inc., Peoria, IL (US)

(72) Inventors: Murali Prasad Logendran, Dunlap, IL (US); Mandar Arvind Joshi, Dunlap, IL (US); Andrew Duncan Rockwell, East Peoria, IL (US); Rick Ian Zadoks, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 16/672,093

(22) Filed: Nov. 1, 2019

(51) Int. Cl.
*F16F 15/173* (2006.01)
*F02B 75/06* (2006.01)
*F02D 28/00* (2006.01)
*G08B 21/18* (2006.01)
*G08B 31/00* (2006.01)
*G08B 5/36* (2006.01)
*B60W 30/20* (2006.01)

(52) U.S. Cl.
CPC .............. *F02D 28/00* (2013.01); *F02B 75/06* (2013.01); *F16F 15/173* (2013.01); *G08B 5/36* (2013.01); *G08B 21/182* (2013.01); *G08B 31/00* (2013.01); *B60W 2030/206* (2013.01)

(58) Field of Classification Search
CPC . B60W 2030/206; F02B 75/06; F16F 15/173; G08B 31/00
USPC ............ 701/111; 123/192.1; 74/573.1, 574.4
See application file for complete search history.

(56) References Cited

U.S. PATENT DOCUMENTS

| 3,901,101 | A | * | 8/1975 | McGavern | .......... | F16F 15/1442 |
| | | | | | | 74/574.4 |
| 7,941,255 | B2 | | 5/2011 | Navot et al. | | |
| 8,935,041 | B2 | | 1/2015 | Hagel et al. | | |
| 2009/0078079 | A1 | * | 3/2009 | Manzoor | ............. | F16F 15/1442 |
| | | | | | | 74/574.4 |
| 2014/0195080 | A1 | * | 7/2014 | Lehmen | ................ | B60W 20/00 |
| | | | | | | 701/22 |
| 2015/0377318 | A1 | * | 12/2015 | Byrne | ................... | F04B 53/006 |
| | | | | | | 700/282 |
| 2017/0011566 | A1 | | 1/2017 | Woo | | |

FOREIGN PATENT DOCUMENTS

| CN | 105716871 | A | 6/2016 |
| EP | 356445 | B1 | 7/1992 |
| JP | 2009244251 | A | 10/2009 |
| WO | 2013117816 | A1 | 8/2013 |

* cited by examiner

*Primary Examiner* — Erick R Solis
(74) *Attorney, Agent, or Firm* — Brannon Sowers & Cracraft

(57) ABSTRACT

Prognostically warning of damper damage in a machine system includes monitoring a machine operating parameter linked with torsional loads on a crankshaft, and a temperature parameter. The prognostic warning strategy also includes populating an operating history of a machine system based on the monitored parameters, calculating a damper damage term based on the operating history, and triggering a damper damage warning where the damper damage term exceeds a threshold.

20 Claims, 3 Drawing Sheets

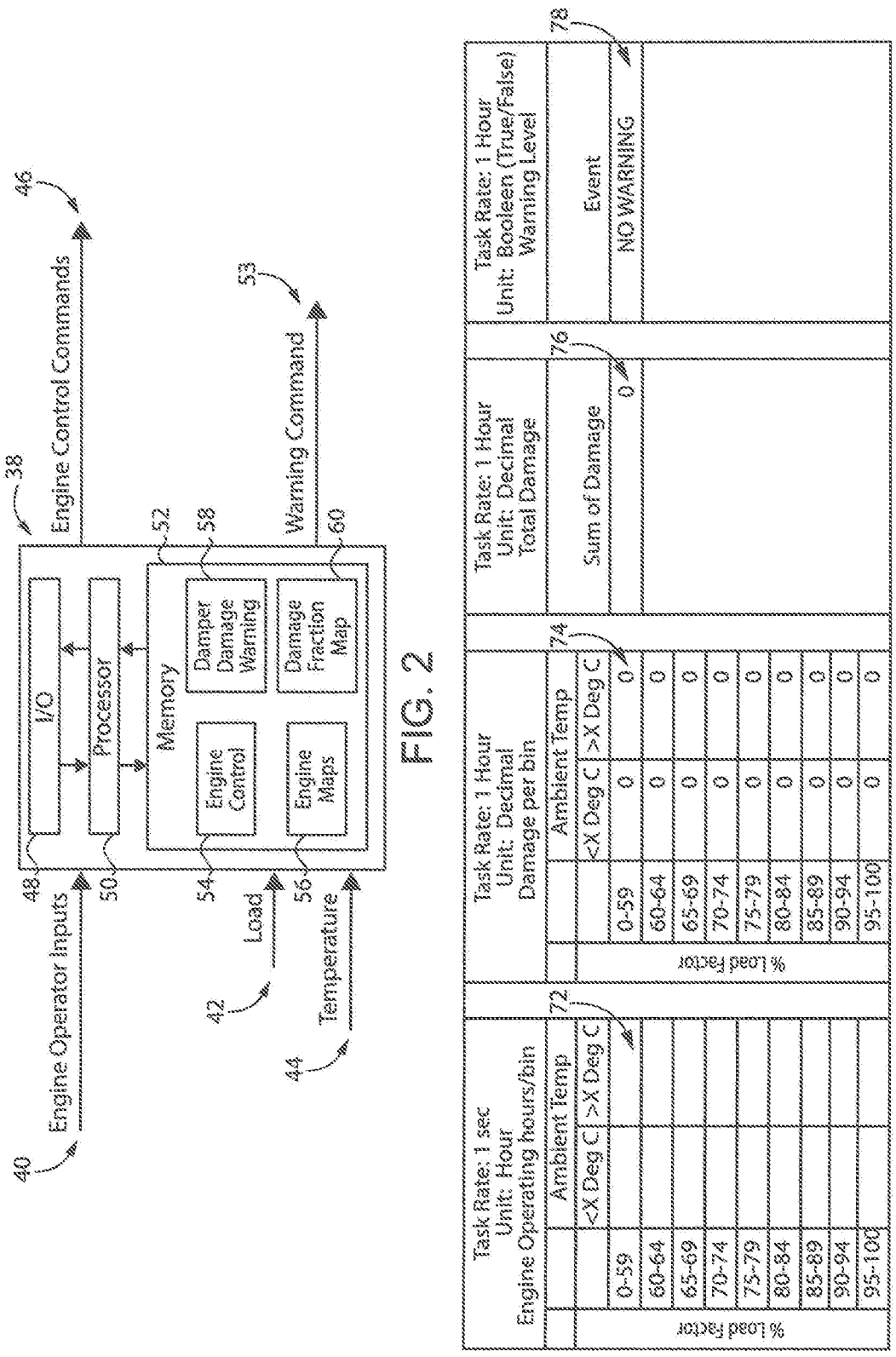

PROGNOSTIC TORSIONAL DAMPER DAMAGE DETERMINATION IN MACHINE SYSTEM

TECHNICAL FIELD

The present disclosure relates generally to monitoring torsional vibration damper health, and relates more particularly to prognostically warning of expected damper damage based on damper and machine system operating history.

BACKGROUND

Mitigation of vibrations and other loading phenomena in all manner of machinery is an ongoing challenge. Machine systems can experience a great variety of externally and internally originating vibrations, shocks, and other harsh service conditions. With rotating machinery it is often desirable to dampen torsional loads and vibrations. In the case of an engine crankshaft, for example, the crankshaft does not rotate at a constant speed, but is instead rapidly accelerated and decelerated in response to combustion in the engine cylinders, compression of gases for combustion, exhaust, opening of valves, application of external loads, and still other phenomena. In this dynamic environment, torsional loads can be additive, subtractive, or create resonances that can damage the engine crankshaft or degrade performance of the engine or associated systems over time.

It is common in modern machine systems, where dampening of torsional loads is desired, to employ a torsional damper. In the case of certain engine systems the torsional damper can include a viscous torsional damper having a rotatable mass in contact with a relatively highly viscous fluid, providing inertia that can reduce or eliminate the occurrence or intensity of problematic torsional loads. Torsional dampers of any type can experience performance degradation or failure over time. One strategy for diagnosing torsional damper condition is set forth in U.S. Pat. No. 8,935,041 where a drivetrain having a driveshaft is equipped with a torsional vibration damper. The diagnostic strategy proposes capturing a reference vibration signal of the driveshaft in a reference state, capturing an operating vibration signal of the driveshaft in an operating state deviating from the reference state, and comparing the reference vibration and operating vibration signals. While the strategy set forth in the '041 patent may have certain applications, the technique appears to require dedicated additional hardware and is relatively complex.

SUMMARY OF THE INVENTION

In one aspect, a method for prognostic warning of damper damage in a machine system includes monitoring a machine operating parameter that is linked with at least one of an amplitude, a frequency, or a direction of torsional loads on a crankshaft in the machine system having a viscous torsional damper coupled therewith. The method further includes monitoring a temperature parameter. The method still further includes populating an operating history of the machine system, based on the monitored machine operating parameter and the monitored temperature parameter, calculating a damper damage term based on the populated operating history, and triggering a damper damage warning based on the calculated damper damage term.

In another aspect, a machine system includes a machine having a crankshaft supported for rotation in a housing, and a viscous torsional damper coupled with the crankshaft. The machine system further includes a damper damage warning system having a warning device, and an electronic control unit in communication with the warning device. The electronic control unit is structured to monitor a machine operating parameter that is linked with at least one of an amplitude, a frequency, or a direction of torsional loads on the crankshaft, and to monitor a temperature parameter. The electronic control unit is further structured to command activation of the warning device, based on the calculated damper damage term.

In still another aspect, an engine control system includes an electronic control unit structured to receive engine operating data for an engine operating parameter that is linked with at least one of an amplitude, a frequency, or a direction of torsional loads on a crankshaft in an internal combustion engine, and to receive temperature data for a temperature parameter. The electronic control unit is further structured to populate an engine operating history based on the data for the engine operating parameter and the data for the temperature parameter, and to calculate a damper damage term based on the populated engine operating history. The electronic control unit is further structured to compare the calculated damper damage term to a stored threshold term, and to command activation of a damper damage warning device based on the comparison of the calculated damper damage term to the stored threshold term.

BRIEF DESCRIPTION OF THE DRAWINGS

FIG. 2 is a functional block diagram of an electronic control unit, according to one embodiment;

FIG. 3 is a table representing software algorithm functions, according to one embodiment.

DETAILED DESCRIPTION

Figure 1:
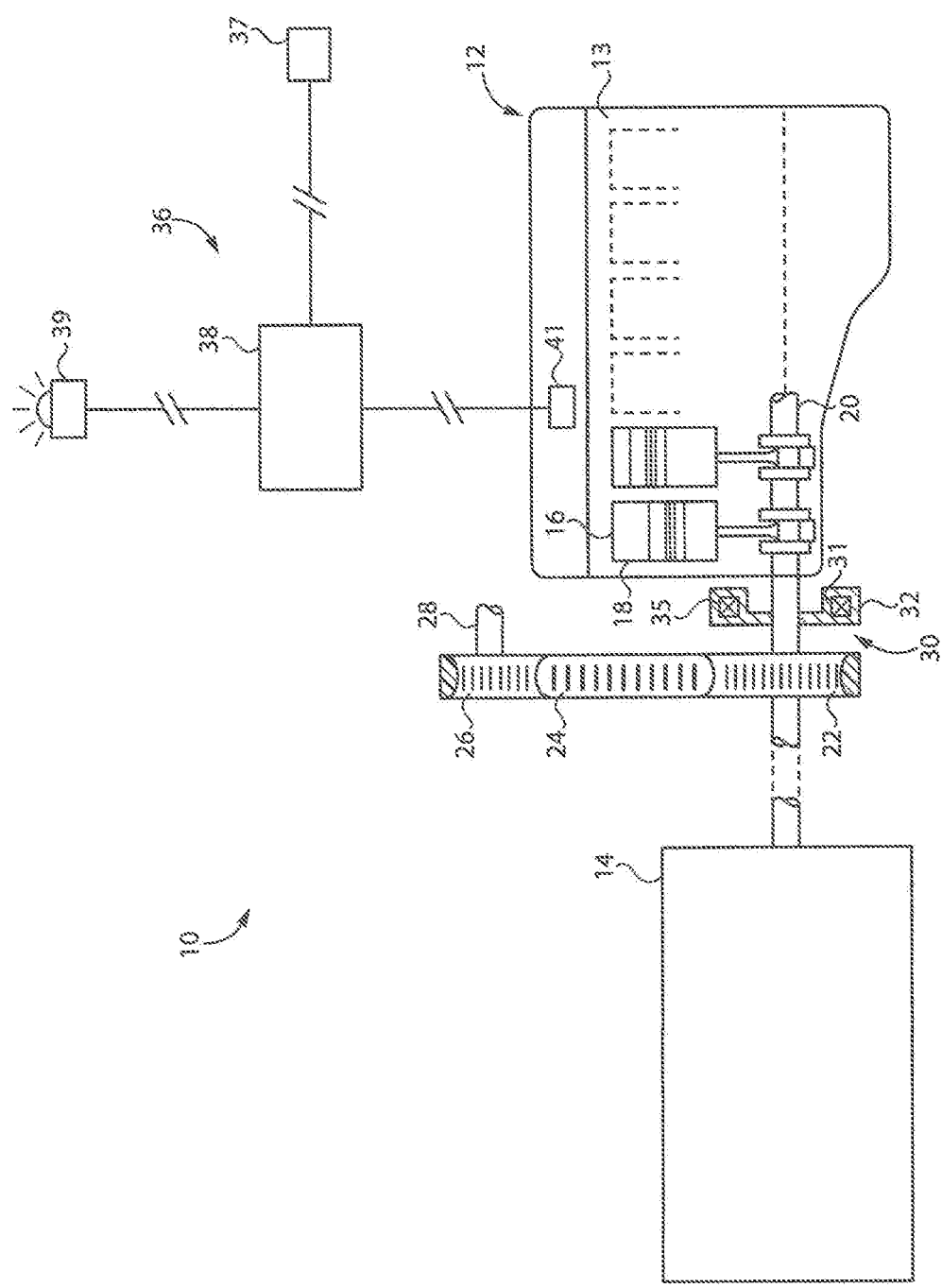
FIG. 1 is a diagrammatic view of a machine system, according to one embodiment.

Referring to FIG. 1, there is shown a machine system 10 including a machine 12, shown in the context of an internal combustion engine. Machine 12 (hereinafter "engine 12") may include a compression ignition internal combustion engine, such as a diesel engine having a housing 13 with a plurality of cylinders 16 formed therein. Cylinders 16 may each be equipped with a piston 18 movable between a top dead center position and a bottom dead center position in a conventional four-stroke engine cycle. Engine 12 also includes a crankshaft 20 supported for rotation in housing 13. Engine 12 may be operable to power an electrical generator 14 to provide electrical power for supplying to a grid, or for operating drive motors in a vehicle, or for still other purposes such as operating a pump, a compressor, or industrial apparatus.

Engine 12 could be coupled with driven machinery other than an electrical generator in other instances. Engine 12 also includes a drive pulley 22 rotated by way of rotation of crankshaft 20 to operate a driven pulley 26 by way of a belt 24. Rotation of driven pulley 26 can rotate an output shaft 28 that operates equipment associated with engine 12 such as a transmission pump, a hydraulic pump, a compressor, a camshaft, or still other types of equipment. Rather than a pulley system, engine 12 might be equipped with a geartrain, or still another rotated system. Engine 12 also includes a viscous torsional damper 30 coupled with crankshaft 20. Damper 30 may include a housing 32, an inertia ring 35 structured to rotate within housing 32, and a fluid space 31 that contains a viscous fluid for communicating rotation between housing 32 and inertia ring 34 in a generally known manner. Damper 30 could include still other components such as bearings of a variety of types.

As suggested above, in certain internal combustion engines, and notably four-stroke piston diesel engines, crankshaft rotation may be non-uniform and dynamic due to the different piston strokes of numerous pistons, including suction, compression, power, and exhaust. In addition to the varying forces communicated between the pistons and the crankshaft, firing order of the individual cylinders can dictate that the crankshaft is continuously accelerated and decelerated. It is generally desirable to prevent passing on of these rotational irregularities and vibrations to a belt drive system, a geartrain, or other driven equipment.

In machine system 10 damper 30 is used for mitigating the various torsional vibrations and loads that can be experienced by crankshaft 20. Damper 30 can thus be exposed to relatively high levels of mechanical stress and strain, including shearing forces on the viscous damping fluid. When a damper in a machine system such as an engine system becomes worn, due at least in part to degradation of the damping fluid, increased engine noise, reduced comfort in a vehicular application, or other phenomena can be observed. Compliance with service and replacement intervals as well as regular inspection can assist in ensuring desired torsional damper functioning.

Nevertheless, damper service life can be unpredictable based on variable factors. Where an engine is used to operate an electrical generator, for example, in a standby generator set application, the challenges can be more acute since standby generator sets may be run at various loads depending on load requirements and used in diverse locations exposed to relatively extreme temperatures and temperature changes. The present disclosure provides a strategy for prognostic warning of damper damage in machine system 10.

To this end, machine system 10 further includes a damper damage warning system or control system 36. Control system 36 may be an on-board engine control system, or a separate control system, having an electronic control unit 38 structured to receive engine operating data for an engine operating parameter that is linked with at least one of an amplitude, a frequency, or a direction of torsional loads on crankshaft 20 in engine 12. Electronic control unit 38 may further be structured to receive temperature data for a temperature parameter.

Control system 36 can monitor the machine operating parameter, monitor the temperature parameter, and populate an operating history of machine system 10 based on the monitored machine operating parameter and the monitored temperature parameter. Electronic control unit 38 may further calculate a damper damage term based on the populated operating history, and compare the calculated damper damage term to a stored threshold term. The damper damage term may be a quantitative or qualitative numerical value that is associated with a relative degree of wear or performance degradation of a viscous damper.

The threshold value can be a numerical value, that has been determined to be associated with a relative degree of wear or performance degradation that justifies warning an operator that further operation of machine system 10 should be suspended or modified until such time as damper 30 can be replaced. The threshold term could be a value which, if equaled or exceeded by the damper damage term, for example, justifies engine shutdown, derating, or operating the machine only in a limp home mode. The threshold term could be determined empirically, or by simulation potentially, for an individual engine or a class of similar engines. Comparing the damper damage term with the threshold term can include a greater-than-or-equal-to comparison, a less-than-or-equal-to-comparison, or via other similar comparison. Based upon the comparison of the calculated damper damage term to a stored threshold term, electronic control unit 38 may command activation of a damper damage warning device 39 in control system 36.

As noted above the monitored machine operating parameter is linked with at least one of an amplitude, a frequency, or a direction of torsional loads on crankshaft 20. The term linked with means directly or indirectly indicative of, approximating, or associated with. In one implementation, the machine operating parameter can include a load factor of engine 12, which can generally be understood as an engine load proportion of a rated engine load. It has been observed that vibration or torsional load amplitude may be greater at certain engine load factor levels than at other engine load factor levels. Certain frequencies, including resonance frequencies, may also tend to be observed more at certain load factor levels than at others. Linking of engine load factor with direction, amplitude, or frequency of torsional loads on crankshaft can be determined empirically, or by simulation potentially, for a class of similar engines or an individual engine. Other parameters having a known, determinable, or estimable relationship with engine load could be targeted for monitoring the engine operating parameter in an analogous fashion.

Accordingly, by monitoring load factor, electronic control unit 38 can gather information about present operating state of engine 12 that can be understood as more or less likely to be associated with undesired or problematic torsional loads, which in turn are associated with relatively greater wear on damper 30. In one implementation, the monitored temperature parameter includes a monitored ambient temperature. In other implementations another temperature parameter might be used.

Control system 36 may also be equipped with an engine sensor 41 for producing the engine operating data for the engine operating parameter. Engine sensor 41 could include one or more sensors which alone or together can monitor one or more parameters indicative of engine load. As engine load cannot be sensed directly, engine sensor 41 can include one or more of a mass flow sensor in an engine air intake system (not shown), a fueling sensor, an engine speed sensor, a torque sensor, a temperature sensor, or still others. A virtual engine load sensor as is known in the art could be used.

Control system 36 may also be equipped with a temperature sensor 37, which can be an ambient temperature sensor exposed to the ambient environment outside of engine 12. Control system 36 also includes warning device 39 with which electronic control unit 38 is in communication. Warning device 39 may include an operator warning light, such as a check engine light, or another operator-perceptible warning device such as a speaker or buzzer. Warning device 39 could be positioned in an operator cab in a mobile vehicular application. Warning device 39 could also include an illuminable indicator or icon on a control pad or even on a graphical user interface. In still another embodiment, a damper damage warning could be logged in a memory and retrieved or observed using a service tool by a technician. As noted above, electronic control unit 38 may trigger and output a damper damage warning signal based on a calculated damper damage term. Triggering the damper damage warning can include commanding activation of warning device 39, as further discussed herein.

Referring now also to FIG. 2, there is shown a functional block diagram of electronic control unit 38 illustrating additional details. Electronic control unit 38 can include an input/output interface 48, and at least one processor 50. Processor 50 may be any suitable processor such as a microprocessor, a microcontroller, or a field programmable gate array (FPGA). Electronic control unit 38 also includes a memory 52. Memory 52 can be any suitable computer readable memory such as RAM, ROM, SDRAM, EEPROM, flash, a hard drive, or still another. Memory 52 stores computer executable program instructions which, upon execution by processor 50, can perform the prognostic warning strategy discussed herein.

In one implementation, electronic control unit 38 includes an engine control unit structured to execute not only the prognostic warning logic of the present disclosure, but also standard engine control functions. To this end, memory 52 may store engine control software 54 and a variety of engine maps 56. Also depicted in FIG. 2 are engine/operator inputs 40 that may be received by electronic control unit 38 and include any of a great variety of parameters such as rotational speeds, pressures, temperatures, and still others that are monitored during operation of engine 12. Operator inputs such as speed requests, fueling requests, or other similar parameters may also be included in inputs 40. Processor 50 may receive inputs 40 and, by executing engine control software 54, produce engine control commands 46. Memory 52 may also store damper damage warning software 58, and a damage fraction map 60 further discussed herein.

Also depicted in FIG. 2 is an engine load input 42 and a temperature input 44. Engine load input 42 can directly or indirectly indicate, or include data associated with, engine load, as discussed herein, and could include a signal from engine sensor 41. Engine load input 42 can, potentially with other information, be used to determine present engine load factor. Temperature input 44 can include a signal from temperature sensor 37. Based upon engine load input 42 and temperature input 44 processor 50, by executing damper damage warning software 58, can produce a warning command 53 to activate warning device 39.

Referring to FIG. 3, there is shown a table 70 of software control functions according to the present disclosure. A plurality of cells 72 in a first table can be populated, by electronic control unit 38, to reflect an operational history of machine system 10. Cells 72 represent bins that are populated with clocked operating times of machine system 10. It can be noted that cells 72 are segregated by temperature, with a left column of cells representing combinations of load factor and temperature less than "X" ° C., and a right column of cells representing combinations of load factor and temperatures above X° C. In one embodiment of the disclosed concepts X° C. might be equal to about 40° C. ambient temperature.

As further discussed below, operating hours of engine 12 per each combination of load factor and temperature can be logged, for instance at a task rate of 1 second. Also shown in table 70 are a plurality of cells 74 that represent calculations of damage per bin, again segregated by temperature and load factor corresponding to cells 72. In the FIG. 3 illustration, since no information has yet been stored in cells 72, total engine hours shown is zero. Similarly, a Sum of Damage shown at 76 is also zero. An event shown at 78 indicates that No Warning is displayed at this point in time. As will be further apparent from the following description, as machine system 10 is operated, engine operating time per bin, such as in seconds, can be logged, damage per bin calculated, a Sum of Damage or total damage calculated, and potentially other processing steps executed to determine whether an event satisfying a condition leading to Warning indication has occurred, or whether an event satisfying a condition leading to No Warning indication has occurred.

It will also be recalled that electronic control unit 38 calculates a damper damage term based on the populated operating history. The damper damage term can include a damper total damage term. In other words, a total damage term can be calculated that reflects the relative wear that damper 30 has likely experienced, or a level of performance degradation that has likely occurred, based on the manner in which machine system 10 has been operated and based on the conditions under which the machine is operated. It will also be recalled that certain combinations of load factor, temperature and/or potentially other factors are expected to have a relatively greater impact on damper life. For this reason, electronic control unit 38 may calculate the damper total damage term based on a weighted cumulation of operating times for machine system 10 for each of the plurality of bins. Operation for a given time in some bins can be expected to affect damper life relatively more or less than operation for the given time in other bins, with the operating time per bin being weighted accordingly. Where operation in one bin is associated with relatively greater damage than another bin, the first bin may be weighted more heavily, for example. It will also be recalled that memory 52 may store a damage fraction map 60.

Damage fraction map 60 may include stored damage fraction terms, determined empirically, for each of the plurality of bins. Processor 50 can read the stored damage fraction terms for calculating damage amounts per bin, such as by multiplying an operating time per bin by the damage fraction term or "damper life weighing term" in the equation below. One example calculation could include multiplying 3.5 hours above 40° C. operating time at 95-100 load factor % by a damper life weighting term of 1.5 to produce a damage amount for the given bin of 5.25. Another example might be multiplying 4.0 hours operating time, below 40° C., at 0-59 load factor % by a damper life weighting term of 0.5 to produce a damage amount for the given bin of 2.0. These numbers are merely to illustrate an example. Calculation of total damage can include calculating a damper total damage term based on a weighted cumulation of the operating times for each of the plurality of bins. One example calculation of the damper total damage term includes calculating the damper total damage term by way of the equation:

$$TD = TA*AF + TB*BF \ldots TX*XF$$

Where:
TD is total damage;
TA, TB ... TX are clocked operating times per bin; and
AF, BF ... XF are damper life weighting terms per bin.

INDUSTRIAL APPLICABILITY

Figure 4:
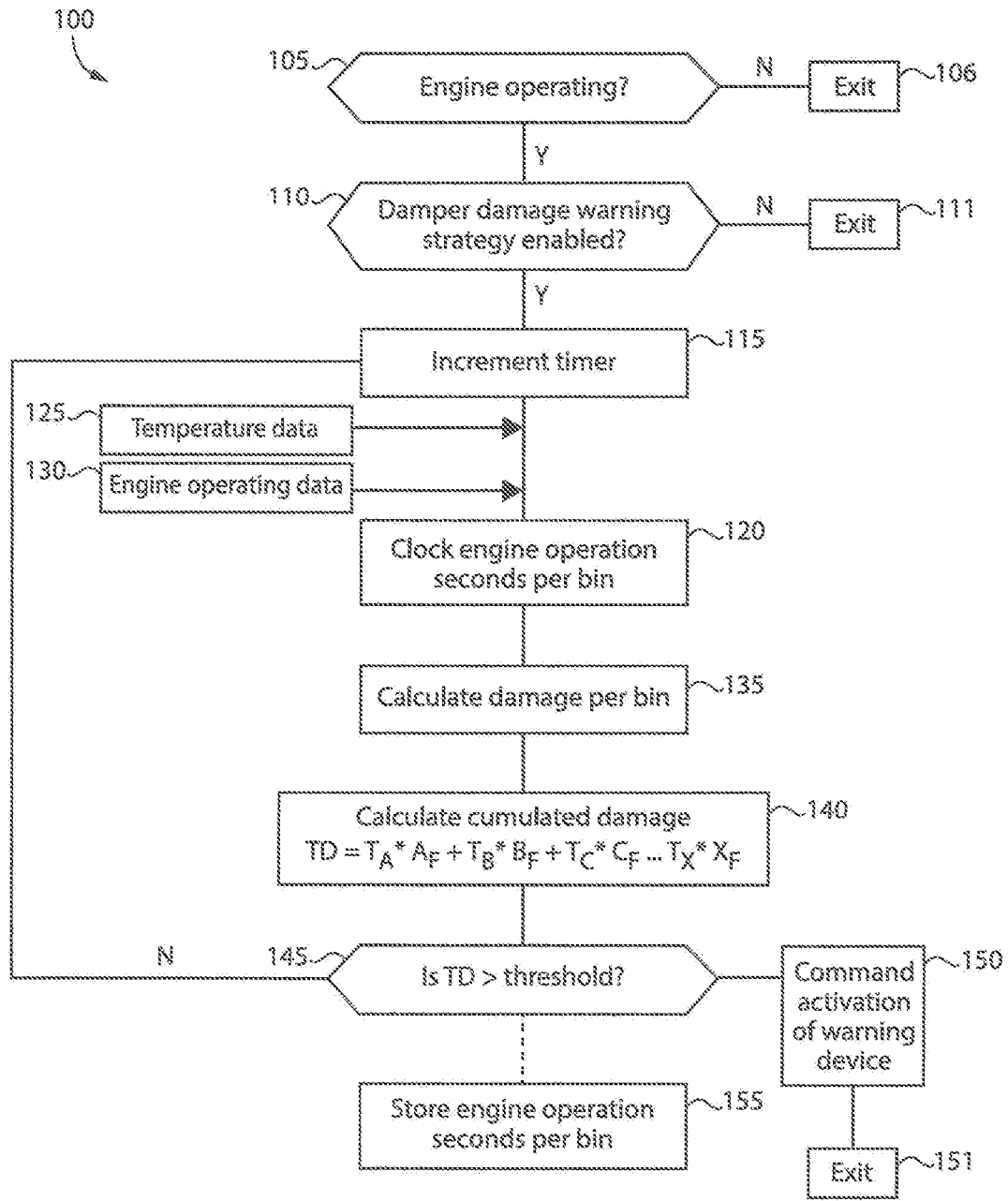
FIG. 4 is a flowchart illustrating example control logic flow, according to one embodiment.

Referring now to FIG. 4, there is shown a flowchart 100 illustrating example logic flow, according to one embodiment of the disclosed concepts. Flowchart 100 commences at a block 105 to query whether engine 12 is operating? If engine 12 is not operating, then the logic can advance to Exit at a block 106. Alternatively, if engine 12 is running, the logic advances to a block 110 to determine whether damper damage warning strategy is enabled. If the warning strategy is not enabled, the logic advances to Exit at a block 111. However, if the warning strategy is enabled, the logic advances to a block 115 to increment a timer. In one implementation, electronic control unit 38 can perform several functions relating to damper damage assessment in time intervals of one second, although the present disclosure is not thereby limited.

From block 115 the logic advances to block 120 to clock engine operating seconds per bin. Again, a different time interval might be used for clocking engine operations. It will be recalled that engine operating seconds per bin can include engine operating seconds for each of a plurality of combinations of engine load factor and ambient temperature, consistent with the illustration in FIG. 3, or using other combinations of load factor, temperature, or other factors. Temperature data as discussed herein is input to the logic flow at a block 125, and engine operating data as discussed herein is input to the logic flow at a block 130.

From block 120 the logic advances to a block 135 to calculate damage per bin, as discussed herein. From block 135 the logic advances to a block 140 to calculate cumulated damage for all bins, such as by way of the equation set forth herein. From block 140 the logic advances to a block 145 to query if the total damage (TD) is greater than a threshold. Block 145 can include comparing the damper damage term to a stored threshold term, also as discussed herein. If TD is greater than the threshold, then the logic advances to a block 150 to command activation of the warning device, for example illuminating a light, sounding an alarm, or sending a text message to an operator's mobile device, and the like. From block 150 the logic advances to a block 151 to Exit. If TD is less than or equal to the threshold, the logic can return to block 115 to again increment the timer. The present strategy can also include storing engine operation seconds per bin at a block 155, for long term storage on at least one of memory 52, a local drive, a remote drive, and the like. Storing engine operation seconds per bin at block 155 can enable transferring the previously logged operational history data to a replacement electronic control unit. A new or replacement electronic control unit is often cloned for installation in an engine. That way, the cumulative damper damage can be incorporated for consideration even when the electronic control unit in a machine system is replaced, but a torsional damper that has not yet reached the end of its service life is not replaced.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims. As used herein, the articles "a" and "an" are intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

LIST OF ELEMENTS 10 machine system
12 machine
13 housing
14 generator
16 cylinder
18 piston
20 crankshaft
22 drive pulley
24 belt
26 driven pulley
28 output shaft
30 damper
31 fluid space
32 damper housing
34 engine sensor
35 inertia ring
36 engine control system
37 temperature sensor
38 electronic control unit
39 warning device
40 engine/operator inputs
41 engine sensor
42 load input
44 temperature input
46 engine control commands
48 input/output interface
50 processer
52 memory
53 warning command
54 engine control software
56 engine maps
58 damper damage warning software
60 damage fraction map
70 chart
72 cells
74 cells
76 damage
78 warning/no warning
100 flowchart
105 step-engine operating?
106 step-exit
110 step-damper damage warning strategy enabled?
111 step-exit
115 step-increment timer
120 step-clock engine operation seconds per bin
125 step-temperature data
130 step-engine operating data
135 step-calculate damage per bin
140 step-calculate cumulated damage
145 step-is td greater than threshold?
150 step-command activation of warning device
151 step-exit
155 step-store engine operation seconds per bin

What is claimed is:

1. A method for prognostic warning of damper damage in a machine system comprising:
monitoring a machine operating parameter that is linked with at least one of an amplitude, a frequency, or a direction of torsional loads on a crankshaft in the machine system having a viscous torsional damper coupled therewith;
monitoring a temperature parameter;
populating an operating history of the machine system based on the monitored machine operating parameter and the monitored temperature parameter;
calculating a damper damage term based on the populated operating history; and
triggering a damper damage warning based on the calculated damper damage term.

2. The method of claim 1 wherein the monitoring of the machine operating parameter includes monitoring a load factor of an internal combustion engine in the machine system.

3. The method of claim 2 wherein the monitoring of the temperature parameter includes monitoring an ambient temperature.

4. The method of claim 2 wherein the populating of the operating history further includes populating a plurality of bins with clocked operating times of the machine system at different combinations of load factor and temperature.

5. The method of claim 4 wherein the calculating of the damper damage term includes calculating a damper total damage term based on a weighted cumulation of the operating times for each of the plurality of bins.

6. The method of claim 5 wherein the calculating of the damper total damage term includes calculating the damper total damage term by way of the equation:

$$TD = TA*AF + TB*BF \ldots TX*XF$$

Where: TD is total damage;
TA, TB . . . TX are clocked operating times per bin; and
AF, BF . . . XF are damper life weighting terms per bin.

7. The method of claim 1 wherein the triggering of the damper damage warning includes commanding activation of an operator warning light.

8. A machine system comprising:
a machine including a crankshaft supported for rotation in a housing, and a viscous torsional damper coupled with the crankshaft;
a damper damage warning system including a warning device, and an electronic control unit in communication with the warning device, the electronic control unit being structured to:
monitor a machine operating parameter that is linked with at least one of an amplitude, a frequency, or a direction of torsional loads on the crankshaft;
monitor a temperature parameter;
calculate a damper damage term based on the monitored machine operating parameter and the monitored temperature parameter; and
command activation of the warning device based on the calculated damper damage term.

9. The machine system of claim 8 wherein the warning device includes an operator warning light.

10. The machine system of claim 8 wherein the damper damage monitoring system further includes an ambient temperature sensor structured to produce an ambient temperature signal, and the electronic control unit is structured to monitor the temperature parameter by way of receiving the ambient temperature signal.

11. The machine system of claim 8 wherein the machine includes a compression ignition internal combustion engine having a plurality of pistons coupled with the crankshaft, and the machine operating parameter includes a load factor of the internal combustion engine.

12. The machine system of claim 11 wherein the electronic control unit is further structured to clock operating times of the machine system at different combinations of load factor and temperature.

13. The machine system of claim 12 wherein the electronic control unit is further structured to populate a plurality of bins in an operating history of the machine system with the clocked operating times.

14. The machine system of claim 12 wherein the damper damage term includes a damper total damage term, and the electronic control unit is further structured to calculate the damper total damage term based on a weighted cumulation of the operating times for each of the plurality of bins.

15. An engine control system comprising:
an electronic control unit structured to receive engine operating data for an engine operating parameter that is linked with at least one of an amplitude, a frequency, or a direction of torsional loads on a crankshaft in an internal combustion engine, and to receive temperature data for a temperature parameter;
the electronic control unit being further structured to populate an engine operating history based on the data for the engine operating parameter and the data for the temperature parameter, and to calculate a damper damage term based on the populated engine operating history; and
the electronic control unit being further structured to compare the calculated damper damage term to a stored threshold term, and to command activation of a damper damage warning device based on the comparison of the calculated damper damage term to the stored threshold term.

16. The engine control system of claim 15 wherein the damper damage term includes a damper total damage term.

17. The engine control system of claim 15 wherein the engine operating parameter includes load factor and the temperature parameter includes ambient temperature.

18. The engine control system of claim 17 wherein the electronic control unit is further structured to clock operating times of the internal combustion engine at a plurality of combinations of load factor and temperature.

19. The engine control system of claim 18 wherein the electronic control unit is further structured to populate a plurality of bins in the operating history with the clocked operating times.

20. The engine control system of claim 19 wherein the electronic control unit is further structured to calculate the damper damage term based on a weighted cumulation of the operating times for each of the plurality of bins.

* * * * *